(12) United States Patent
Wagner

(10) Patent No.: US 7,230,526 B2
(45) Date of Patent: Jun. 12, 2007

(54) DEVICE AND METHOD FOR SYNCHRONIZING A FLASHER FREQUENCY WITH A CENTRAL FLASHING FREQUENCY

(75) Inventor: Michael Wagner, Bad Abbach (DE)

(73) Assignee: Siemens Aktiengesellschaft, Munich (DE)

(\*) Notice: Subject to any disclaimer, the term of this patent is extended or adjusted under 35 U.S.C. 154(b) by 190 days.

(21) Appl. No.: 11/126,060

(22) Filed: May 9, 2005

(65) Prior Publication Data

US 2005/0248442 A1 Nov. 10, 2005

(30) Foreign Application Priority Data

May 7, 2004 (DE) .................. 10 2004 022 555

(51) Int. Cl.
*B60Q 1/52* (2006.01)
(52) U.S. Cl. .............. 340/471; 340/657; 340/658; 340/693.3; 340/331; 340/332
(58) Field of Classification Search .............. 340/471, 340/458, 657, 658, 693.1, 693.3, 331, 332
See application file for complete search history.

(56) References Cited

U.S. PATENT DOCUMENTS

| 5,313,188 | A | * | 5/1994 | Choi et al. ............. 340/331 |
| 5,764,140 | A | * | 6/1998 | Izumi ..................... 340/471 |
| 5,808,545 | A | * | 9/1998 | Brueggemann et al. ..... 340/468 |
| 5,945,788 | A | * | 8/1999 | Li et al. ................. 315/308 |
| 5,969,483 | A | * | 10/1999 | Li et al. ................. 315/225 |
| 6,240,190 | B1 | * | 5/2001 | Huang ..................... 381/61 |
| 6,637,917 | B2 | | 10/2003 | Schwanz et al. |
| 6,909,944 | B2 | * | 6/2005 | Pillar et al. ............... 701/1 |

FOREIGN PATENT DOCUMENTS

| EP | 1 195 296 A2 | 4/2002 |
| JP | 11 115 627 | 4/1999 |

\* cited by examiner

*Primary Examiner*—Daryl C Pope
(74) *Attorney, Agent, or Firm*—Laurence A. Greenberg; Werner H. Stemer; Ralph E. Locher

(57) ABSTRACT

A device performs a synchronization between flasher frequencies of flasher devices and a central flashing frequency of a central control device at times when a data transmission device is in the active state. For a synchronization, a correction signal is determined in the central control device from a deviation of a phase of the flasher frequency relative to a phase of the central flashing frequency and transmitted to a flasher control device which modifies the flasher frequency phase in response to the correction signal. Following the modification of the flasher frequency phase the data transmission device is switched back once more into an idle state. This offers the advantage that a synchronization of flasher devices with a central control device can be performed, whereby a data transmission device does not need to be permanently active and can therefore be used in a power-saving way.

12 Claims, 2 Drawing Sheets

DEVICE AND METHOD FOR SYNCHRONIZING A FLASHER FREQUENCY WITH A CENTRAL FLASHING FREQUENCY

BACKGROUND OF THE INVENTION

Field of the Invention

The invention relates to the field of automotive electronics and more particularly to the control of a hazard warning or emergency flasher system of a motor vehicle.

Statutory road traffic regulations require every licensed motor vehicle to have a hazard warning system. The hazard warning system has at least four and frequently eight or more flasher lamps which it is necessary to activate accordingly for operation of the hazard warning system, that is to say in order to provide the hazard warning or emergency flashing function. The flasher lamps are disposed in a distributed configuration in the vehicle and are usually controlled separately by a plurality of control devices (for example: body controller front, body controller rear, door control device right, door control device left, etc.).

The flashing frequency at which the hazard warning system is to flash is preset by a central control device, referred to as the flasher master. All the flasher lamps are activated synchronously so that they ideally light or are off simultaneously. In order to achieve such synchronism, the individual control devices must be synchronized with one another. Such synchronization is achieved for example by an active bus system. However, this has the disadvantage that the battery becomes discharged very quickly, that is to say the battery loses capacity when the engine is stationary, since all the subscribers connected to the bus system, such as, for example, an engine controller, measuring sensors or the like, are also activated. If no synchronization is performed, the flashing frequency is preset by the individual control devices. These have quartz crystal oscillators as timing generators, the quartz crystal oscillators being of very simple configuration for cost reasons and consequently subject to high tolerances. However, this has the disadvantage that the flasher frequencies of the individual flasher lamps rapidly diverge on account of the high tolerances of the low-cost quartz crystal oscillators used and consequently no synchronism is guaranteed.

As well as maintaining the bus system (CAN bus) active for the duration of the hazard warning or emergency flashing, it is also possible as an alternative to use an additional synchronization line between all the control devices involved in the hazard warning or emergency flashing. However, additional costs are incurred owing to the use of the additional synchronization line. Moreover there is also an increase in the amount of space required for the additional cabling of the synchronization lines in the vehicle.

European patent application EP 1 195 296 A2 (corresponding to U.S. Pat. No. 6,637,917) describes a side flasher lamp for installation in a cover cap of an outside rear view mirror of a motor vehicle. However, the side flasher lamp has the disadvantage that due to the absence of a device for synchronization no synchronous flashing function of this side flasher lamp with other flasher lamps is present.

Japanese patent application JP 11 115 627 A describes a flasher frequency control device which uses a multiple transmission device or a data bus in a vehicle in order to synchronize a computerized flashing function of a flasher lamp by a synchronization signal which is transmitted by a different computer. For this purpose a first computer generates a signal in order to stop the flashing of a first lamp. The stop signal is based on a flashing frequency of a second computer that controls a second flasher lamp. In this case the first computer transmits the first synchronization signal with the specific period to the second computer in order to synchronize the flashing rate of the flasher lamp of the second computer by the synchronization signal to the flashing frequency of the first computer. The synchronization is effected by a resetting of the flashing frequency phase of the second computer by the synchronization signal.

However, the flasher frequency control device described in JP 11 115 627 A has the disadvantage that in order to synchronize the flashing frequencies of the two computers either the data bus must be permanently active or a further synchronization line is required for synchronizing the two computers. Furthermore the flashing frequency control apparatus has the disadvantage that as a result of the resetting of the flasher frequency phase of the second computer a flasher frequency phase of the second computer is possibly truncated such that a well-defined switching behavior is no longer ensured due to the truncated second flasher frequency phase. As a result of this an undefined switching state could be propagated onto the bus or on the synchronization line due to "glitches" or "spikes" that occur, the undefined switching state having negative effects on the safety-relevant control signals transmitted via the bus. A disadvantageous impact on the synchronization signal disclosed in JP 11 115 627 A can arise in the form of needle pulses on the synchronization line or the data bus if as a result of over-couplings such signal peaks are transmitted to safety-relevant data lines—such as, for example, the control lines for activation of the airbag.

SUMMARY OF THE INVENTION

It is accordingly an object of the invention to provide a device and a method for synchronizing a flasher frequency with a central flashing frequency which overcome the above-mentioned disadvantages of the prior art devices and methods of this general type, which synchronizes a flasher frequency with a central flasher frequency, and can be implemented cost-effectively and efficiently. A further object is to create a central flasher frequency, which is energy-saving in operation and enables a well-defined switching behavior.

Accordingly there is provided a device for synchronizing a flasher frequency with a central flashing frequency. The device has a central control device which provides a central flashing frequency, a flasher device which provides a different flasher frequency from the central flashing frequency, and a data transmission device which can be switched alternately into an active state and an idle state. Information is transferable between the central control device and the flasher device in the active state and no information is transferable between the central control device and the flasher device in the idle state. The central control device is embodied so as to determine, after a switchover of the data transmission device from the idle state to the active state, information relating to a phase of the flashing frequency from the flasher device in order to provide a correction signal for the flasher device. The correction signal is dependent on a phase of the flasher frequency and a phase of the central flashing frequency, and the flasher device is embodied so as to modify the phase of the flasher frequency and/or the flasher frequency itself in response to the correction signal in order to synchronize the flasher frequency with the central flashing frequency.

A method for synchronizing the flasher frequency with the central flashing frequency includes the steps of:

providing a central flashing frequency of a central control device;

providing a flasher frequency from a flasher device, the flasher frequency being different from the central flashing frequency;

switching over a data transmission device into an active state, which device can be switched alternately into an active state and an idle state, information being transferred between the central control device and the flasher device in the active state and no information being transferred between the central control device and the flasher device in the idle state;

determining information relating to a phase of the flasher frequency of the flasher device by the central control device;

providing a correction signal that is dependent on the phase of the flasher frequency and a phase of the central flashing frequency for the flasher device; and modifying the phase of the flasher frequency in the flasher device as a function of the correction signal for the purpose of synchronizing the flasher frequency with the central flashing frequency.

In the present invention a synchronization of the flasher frequencies with the central flasher frequency can be performed when the data transmission device is in the active state, whereas in the idle state the flasher frequencies of the individual flasher devices are freewheeling, that is to say unsynchronized. As a result quartz crystal oscillators, which can be manufactured at low cost and have slight frequency deviations can be integrated in the flasher control devices. A synchronization of the individual flasher control devices with the central control device is performed only in discrete (first) time intervals, namely the active state of the data transmission device, whereas in further (second) time intervals in which the data transmission device is in the idle state the freewheeling flasher control device can be used.

Such an approach additionally offers the advantage that the data transmission device, for example a data bus, only needs to be activated for a short time in order to perform the synchronization of the flasher devices with the central control device and to be inactive, that is to say in the idle state, for a relatively long time and in this way be used in an energy-saving manner. At the same time, however, the functionality of the synchronization of the flasher frequency with the central flashing frequency and the well-defined switching behavior on the data transmission device are also possible.

In an advantageous embodiment the central control device contains a device for switching over between the active state and the idle state. The device for switching over measuring a time duration of the active state or the idle state. This offers the advantage that it is possible for the central control device to initiate a synchronization of the flasher frequency with the central flashing frequency after a defined idle time of the data transmission device, for example a data bus, and in this way prevent too wide a "divergence" of the flasher frequency relative to the central flashing frequency.

In a further advantageous embodiment a further flasher device is provided for providing a further flasher frequency, the further flasher frequency is different from the flasher frequency, and the central control device provides a further correction signal, different from the correction signal, for the further flasher device. This offers the advantage of being able to use the synchronizing device also for synchronization of a plurality of flasher devices operating at different flasher frequencies.

In a further advantageous embodiment the central control device is embodied so as to transmit to the flasher device an interrogation signal for determining the phase of the flasher frequency in response to a switchover of the data transmission device from the idle state to the active state, and with the flasher device being embodied so as to determine, in response to the interrogation signal, the phase of the flasher frequency and transmit the phase of the flasher frequency thus determined via the data transmission device in a phase signal to the central control device. This offers the advantage that the flasher device does not need to determine the phase of the flasher frequency constantly, but only when the central control device wishes to perform a synchronization. Operation of a flasher device embodied in such a way can have an energy-saving effect.

In an advantageous embodiment the central control device is embodied so as to determine the correction signal for the flasher device on the basis of a difference between the phase signal and a phase of the central flashing frequency. This offers the advantage that the correction signal for the flasher device can be calculated in a simple manner.

In an advantageous embodiment the flasher device is embodied so as to effect, in response to the correction signal for the flasher device, a delay in the phase of the flasher frequency by a defined delay interval that is dependent on the correction signal. In contrast to a "resetting" of the phase, as is disclosed in patent application JP 11 115 627 A cited at the beginning, such a delay produces the advantage that short-lived switching states can almost always be avoided, thereby reducing the risk of causing an undefined switching state as a result of the synchronization.

In a further embodiment the flasher device is embodied so as to confirm an error-free reception of a correction signal to the central control device by an acknowledgement signal. Furthermore the device for switching over is embodied so as to switch the data transmission device to the idle state in response to the acknowledgement signal. This offers the advantage that the device for switching over has to switch the data transmission device to the active state only for the time interval that is necessary in order to perform the synchronization. By as prompt as possible a switchover of the data transmission device to the idle state a further contribution can therefore be made to the saving of energy.

In an advantageous embodiment the flasher device performs a synchronization of the phase of the flashing frequency with a phase of the further flashing frequency of the further flasher device prior to the transmission of the acknowledgement signal to the central control device. This offers the advantage that a further synchronization enables an increase in the synchronism of the flasher devices.

In an advantageous embodiment it can be regarded as an advantage of a device for synchronizing that is embodied in such a way that a switchover from the idle state to the active state is to take place only after a specific time of, for example, one minute has elapsed, after the data transmission device has been switched over from the active state to the idle state. A time control of this type enables too frequent synchronizations between the flasher device and the central control device to be avoided, which has an effect in terms of a further optimization of the energy requirements of the device for synchronizing.

Furthermore, in an advantageous embodiment the flasher device contains at least one flasher lamp, the flasher device alternately switching the flasher lamp on and off at the flasher frequency. This offers the advantage of being able to output the provided flasher frequency directly as flashing light of the flasher lamp in order to be able to ensure the prescribed hazard warning or emergency flashing function for motor vehicles.

In an advantageous embodiment the central control device contains a central flasher lamp and the central control device switches the central flasher lamp on and off at the central flashing frequency. Such an embodiment offers the advantage that the central control device can be embodied in an analogous form to a flasher device. Therefore during manufacture one of the manufactured flasher devices, for example, can be provided with the above-described function of the central control device, as a result of which manufacturing costs for a separate central control device can be avoided.

According to an advantageous embodiment the data transmission device is embodied so as to transmit a further signal between a data source and a data sink, the data source and the data sink of the central control device and the flasher device being different. This offers the advantage that the data transmission device can be embodied as a data bus and need not be used solely as a synchronization line. A data transmission device embodied in such a way therefore has a cost-saving and space-saving effect in the cabling of the motor vehicle electronics.

Other features which are considered as characteristic for the invention are set forth in the appended claims.

Although the invention is illustrated and described herein as embodied in a device and a method for synchronizing a flasher frequency with a central flashing frequency, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
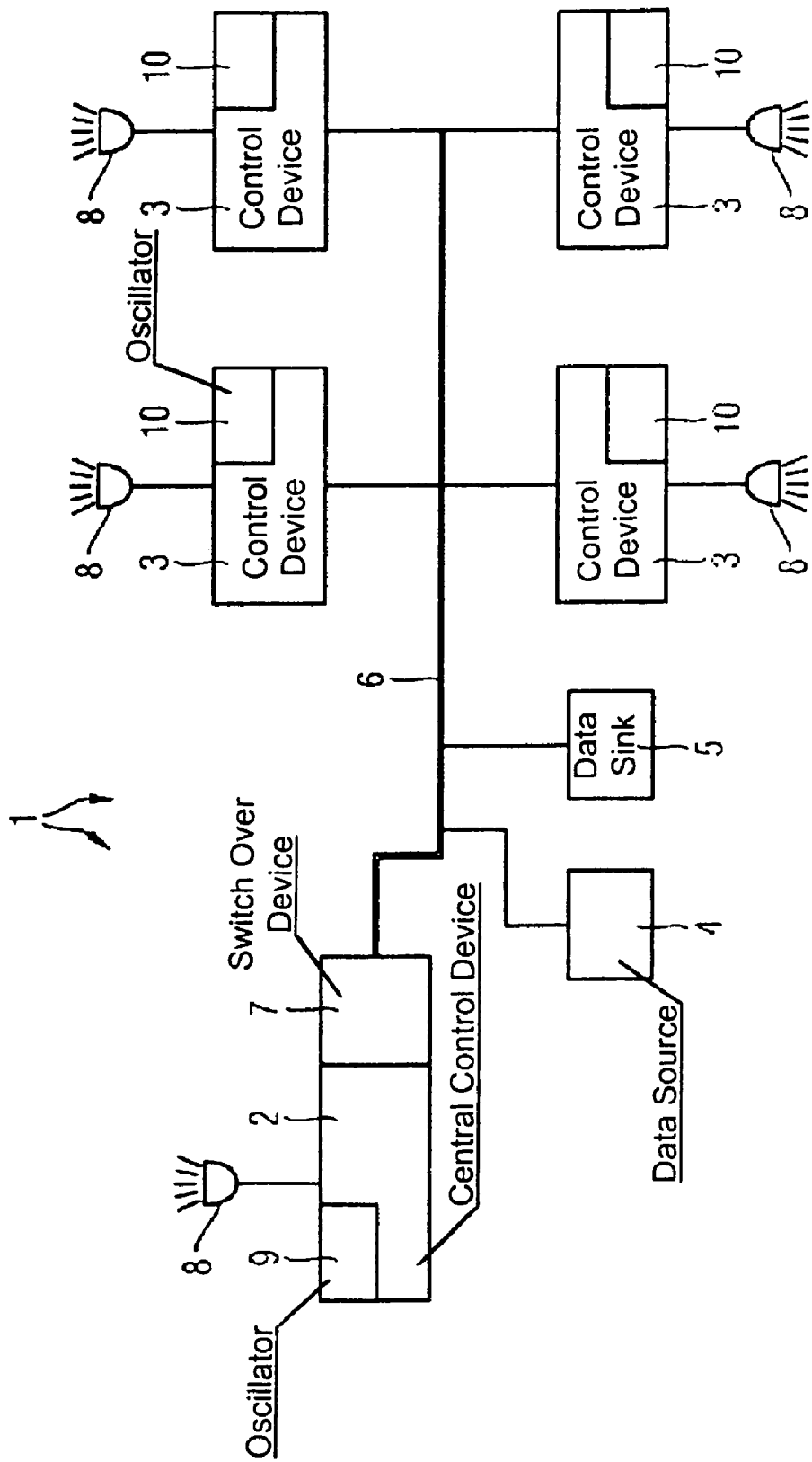
FIG. 1 is a block diagram of an exemplary embodiment of a synchronizing device according to the invention.

In the figures of the drawings identical and functionally identical elements and signals are provided with the same reference symbols in so far as nothing is stated to the contrary. Referring now to the figures of the drawing in detail and first, particularly, to FIG. 1 thereof, there is shown a block diagram of an exemplary embodiment of a synchronizing device 1 according to the invention.

The device 1 for synchronizing contains a central control device 2, one or more (four, in the present exemplary embodiment) flasher control devices 3, a data source 4 and a data sink 5. The central control device 2 is connected via a data transmission device 6, for example a data bus, to the flasher control devices 3, the data source 4 and the data sink 5. The central control device 2 further has a device 7 for switching over the data transmission device 6 to the active state or the idle state.

In addition the central control device 2 and the flasher control devices 3 each contains a flasher lamp 8, the flasher lamps 8 each being connected to the central control device 2 or one of the flasher control devices 3. The central control device 2 further has an oscillator 9 for providing a central flashing frequency, whereby the flasher lamp 8 which is connected to the central control device 2 and which may be, for example, a warning light for the hazard warning system in the instrument panel of the motor vehicle, can be switched on or off at the central flashing frequency. Furthermore each of the flasher control devices 3 has an oscillator 10 which provides a flasher frequency of the flasher control device 3. The flasher lamps 8 connected to the corresponding flasher control device 3, for example, can then be controlled by the flasher frequency, that is to say switched on or off at the flasher frequency.

It should be noted in this context that due to manufacturing-related tolerances of the oscillators 9, 10 of the flasher control devices 3 and the central control device 2 a flasher frequency and a central flashing frequency are provided, whereby each flasher frequency may be different from the others and also from the central flashing frequency of the central control device 2. In order to achieve a synchronization between the central flashing frequency of the central control device 2 and the flasher frequency of the flasher devices 3, the data transmission device 6 can be switched to an active state by the device 7 for switching over and an interrogation signal can be sent by the central control device 2 to the flasher devices 3. In response to the interrogation signal the flasher devices 3 can determine a flasher frequency phase of the corresponding flasher device oscillators 10 and transmit a phase signal back to the central control device 2. Accordingly each of the phase signals corresponds to a flasher frequency phase of one of the four flasher devices 3. By the thus obtained four phase signals which are transmitted to the central control device 2 by each flasher device 3, the central control device 2 can calculate a corresponding correction signal for each of the flasher devices 3. The correction signal can be transmitted to the corresponding flasher devices 3 via the data transmission device 6.

After correct reception of the corresponding correction signal each flasher device 3 can transmit an acknowledgement signal to the central control device 2 via the data transmission device 6, as a result of which the central control device 2 receives information indicating that each correction signal has been correctly received at the flasher device 3 assigned to the correction signal. In this context correct reception of the correction signal by the flasher device 3 can be confirmed for example by an error-detecting coding in the central control device 2 and a corresponding decoding in the flasher device 3. Once the central control device 2 has received the acknowledgement signal from each flasher control device 3, the data transmission device 6 can be switched back again to the idle state by the device 7 for switching over. As a result of the switching over of the data transmission device 6 to the idle state energy can therefore be saved, thereby advantageously extending, for example, the useful life and/or the charging intervals of the car battery.

It should further be noted in relation to the data transmission device 6 that the latter can be efficiently implemented for example by use of the CAN bus that is already commonly available in more recent vehicles. For this purpose the data transmission device 6 can be embodied also to transmit information from the data source 4 to the data sink 5, for example, in the active state of the data transmission device 6 in addition to the transmission of information or signals between the central control device 2 and the flasher control devices 3. The data transmission device 6 embodied in such a way affords the advantage that the data transmission device 6 that is already present in motor vehicles, more particularly an already present bus, can be used further, as a result of which a separate synchronization line is no longer required. This has a twofold effect, first by saving space and second by lowering costs.

As a result of the use of the data transmission device 6 in the form of a data bus, for example a MOST bus, CAN bus, etc., it is however necessary for a reliable and correct state monitoring of the signals on the data bus to be possible with the result that no undefined state transitions occur on bus lines. An over-coupling of pulse signals into adjacent bus lines on which, for example, safety-relevant data such as an activation signal for the airbag is transmitted, should therefore favorably not take place.

Figure 2:
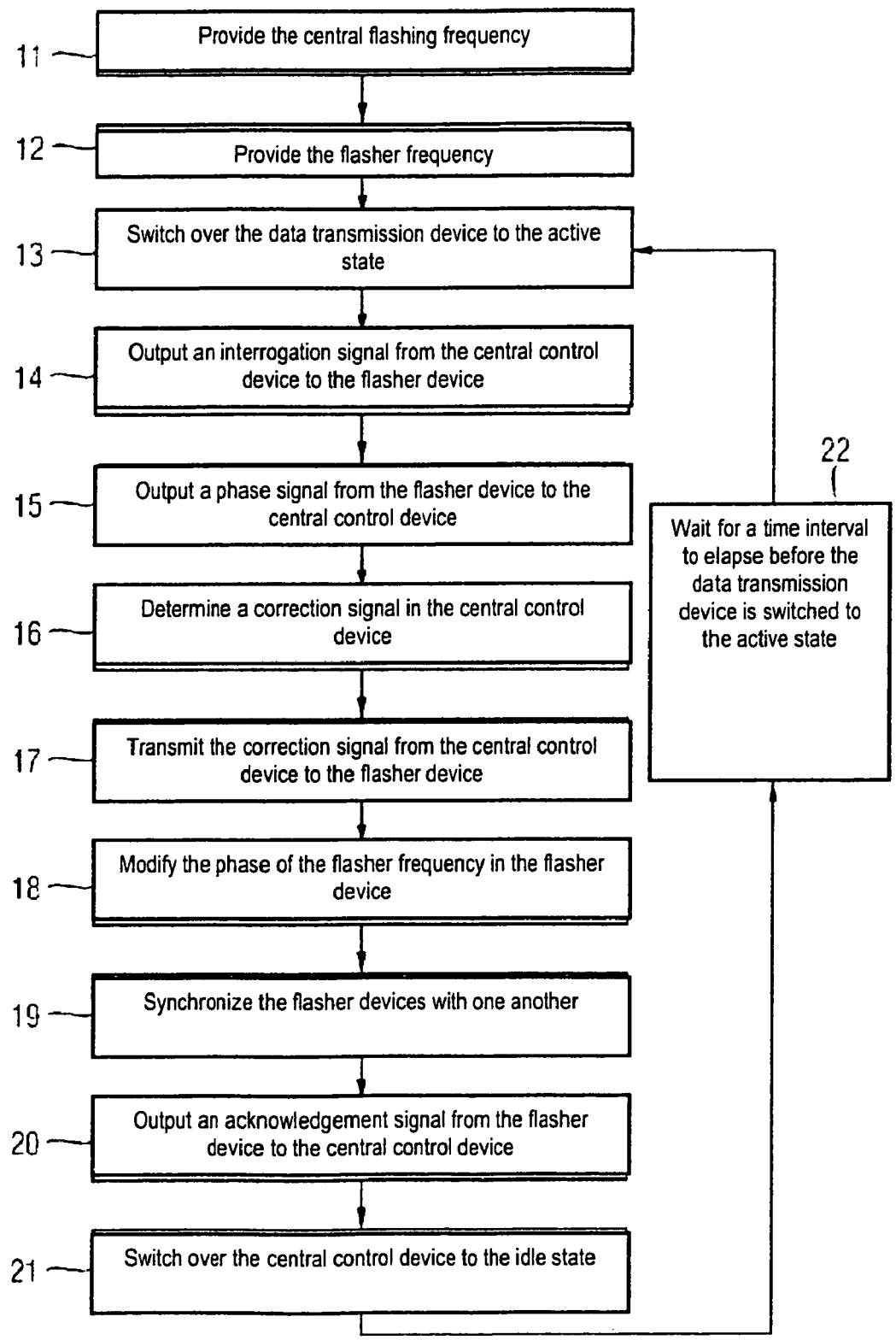
FIG. 2 is a flow chart for showing an exemplary embodiment of a synchronizing method according to the invention.

FIG. 2 shows a flowchart of an exemplary embodiment of the inventive method for synchronizing a flasher frequency with a central flasher frequency, which method will be described briefly below.

In the method illustrated in FIG. 2, in a first step 11 the central flashing frequency is provided in the central control device 2. In a following step 12 the flasher frequency is provided by the flasher control devices 3. Next, in step 13, the data transmission device 6 is switched to the active state by the device 7 for example.

If the data transmission device 6 is in the active state, in a subsequent method step 14 the interrogation signal is output by the central control device 2 to the flasher devices 3. In response to the interrogation signal from the central control device 2, in a further method step 15 a phase of the flasher frequency provided by the oscillator 10 of the corresponding flasher control device 3 is determined by each of the flasher devices 3 and output as a phase signal to the central control device 2.

From the knowledge of the phase information of each flasher frequency of the individual flasher devices 3, in a further method step 16 a separate correction signal is determined by the central control device 2 for each flasher device 3, for example by calculation of the difference between a central flashing frequency phase preset by the oscillator 9 of the central control device 2 and the flasher frequency phase in one of the flasher devices 3.

The correction signal determined for each of the flasher devices 3 can be transmitted in a following method step 17 from the central control device 2 to the corresponding flasher device 3. Based on the knowledge of the correction signal and the flasher frequency phase in each flasher device 3, the corresponding flasher frequency phase can then be modified in the flasher control device 3. This is implemented for example by delaying the flasher frequency phase in accordance with a value of the correction signal. This then results for example in an extension of a single cycle of the flasher frequency, as a result of which a well-defined and therefore more reliable switching behavior is possible compared with a known reset or a known truncation of a flasher frequency period in the prior art.

In a further method step 19, the flasher devices can be synchronized with one another using a procedure analogous to that described above. Directly following this, a further method step 20 can take place in which the acknowledgement signal is output from the flasher device 3 to the central control device 2. Once the central control device 2 has received an acknowledgement signal from each of the flasher devices 3 connected to the data transmission device 6, the data transmission device 6 can then be switched to the idle state by the device 7 for switching over (method step 21). Such a switchover of the data transmission device 6 to the idle state advantageously enables electrical energy to be saved and consequently the battery capacity or the battery charge cycle to be extended. In addition, however, it also enables the synchronization of the individual flasher devices 3 with the central control device 2, which presets the central flashing frequency as a master timing pulse.

Following the switchover of the data transmission device 6 to the idle state (method step 21), a time measurement is started, for example. After a pre-definable time interval of, for example, one minute has elapsed (method step 22), the data transmission device 6 is switched back again into the active state and a new synchronization cycle is executed in accordance with the steps 13–21.

The time interval during which the data transmission is in the idle state is advantageously chosen such that it is longer than a time interval in which the method steps of the switching of the data transmission device 6 to the active state (step 13) through to the switchover of the data transmission device 6 to the idle state (method step 21) are performed. Through the choice of a longer time interval than the time interval just referred to, a favorable ratio of current requirement for providing the synchronization function relative to a current requirement in the idle state can therefore be chosen.

To sum up, it should therefore be noted that after a running-in phase the bus can "go to sleep" and is woken cyclically for the purpose of synchronization at relatively long intervals of, for example, one minute. During the synchronization pauses the flashing is controlled by the respective control device (that is to say, the flasher device). In order to avoid asynchronism, the flashing frequency is measured by the flasher master, that is to say the central control device, before a synchronization is performed. Toward that end each slave control device—flasher device— must toggle a signal at the flasher frequency generated by it onto the bus. From a plurality of these flashing cycles the flasher master calculates for each slave control device a correction factor which corrects the deviation of the flashing frequency of the slave control device relative to the master control device. The correction factors are communicated to the slave control devices and the latter independently correct their flashing frequency. Following this, an analogous synchronization of the individual slave control devices is performed and the bus returns once more to the idle state. A significant advantage of an approach of this kind resides above all in the fact that no additional synchronization lines are required between the control devices, but instead a bus that is already present in any case can be used. During the hazard warning or emergency flashing the current requirement in the vehicle is reduced because the bus can repeatedly "go to sleep".

This application claims the priority, under 35 U.S.C. § 119, of German patent application No. 10 2004 022 555.9, filed May 7, 2004; the entire disclosure of the prior application is herewith incorporated by reference.

I claim:

1. A device for synchronizing a flasher frequency with a central flashing frequency, comprising:
   a central control device providing the central flashing frequency;
   a flasher device providing the flasher frequency being different from the central flashing frequency;
   a data transmission device which can be switched alternately into an active state and an idle state, information being transferable between said central control device and said flasher device in the active state and no information being transferable between said central control device and said flasher device in the idle state;

said central control device determining, after a switchover of said data transmission device from the idle state to the active state, information relating to a phase of the flashing frequency from said flasher device for providing a correction signal for said flasher device, said correction signal being dependent on the phase of the flasher frequency and a phase of the central flashing frequency; and said flasher device modifying the phase of the flasher frequency and/or the flasher frequency itself in response to the correction signal for synchronizing the flasher frequency with the central flashing frequency.

2. The device according to claim 1, wherein said central control device contains a device for switching over between the active state and the idle state, said device for switching over measuring a time duration of the active state or of the idle state.

3. The device according to claim 2, further comprising a further flasher device providing a further flasher frequency, the further flasher frequency being different from the flasher frequency, and said central control device provides a further correction signal, different from the correction signal, for said further flasher device.

4. The device according to claim 1, wherein said central control device transmits to said flasher device an interrogation signal for determining the phase of the flasher frequency in response to the switchover of said data transmission device from the idle state to the active state, and with said flasher device being embodied so as to determine, in response to the interrogation signal, the phase of the flasher frequency and/or the flasher frequency and transmit the phase of the flasher frequency thus determined and/or the flasher frequency via said data transmission device in a phase signal to said central control device.

5. The device according to claim 4, wherein said central control device determines the correction signal for said flasher device on a basis of a difference between the phase signal and the phase of said central flashing frequency.

6. The device according to claim 1, wherein said flasher device is embodied so as to effect, in response to the correction signal for said flasher device, a delay in the phase of the flasher frequency by a defined delay interval that is dependent on the correction signal.

7. The device according to claim 3, wherein said flasher device confirms an error-free reception of the correction signal to said central control device by use of an acknowledgement signal, and said device for switching over switches said data transmission device to the idle state in response to the acknowledgement signal.

8. The device according to claim 7, wherein said flasher device performs a synchronization of the phase of the flashing frequency with a phase of the further flashing frequency of said further flasher device prior to a transmission of the acknowledgement signal to said central control device.

9. The device according to claim 1, wherein said flasher device contains at least one flasher lamp and said flasher device alternately switches said flasher lamp on and off at the flasher frequency.

10. The device according to claim 9, wherein said central control device contains a central flasher lamp and said central control device switches said central flasher lamp on and off at the central flashing frequency.

11. The device according to claim 1, further comprising:
a data source; and
a data sink, said transmission device transmits a further signal between said data source and said data sink.

12. A method for synchronizing a flasher frequency with a central flashing frequency, which comprises the steps of:
providing the central flashing frequency from a central control device; providing the flasher frequency from a flasher device, the flasher frequency being different from the central flashing frequency;
switching over a data transmission device into an active state, the data transmission device can be switched alternately into the active state and an idle state, information being transferred between the central control device and the flasher device in the active state and no information being transferred between the central control device and the flasher device in the idle state;
determining information relating to a phase of the flasher frequency of the flasher device by the central control device;
providing a correction signal for the flasher device, the correction signal being dependent on the phase of the flasher frequency and a phase of the central flashing frequency; and
modifying the phase of the flasher frequency in the flasher device in dependence on the correction signal for synchronizing the flasher frequency with the central flashing frequency.

* * * * *